Patented Dec. 9, 1952

2,621,206

UNITED STATES PATENT OFFICE 2,621,206

PROCESS FOR THE ISOMERIZATION OF 1-KETO-2-ALKYL-OCTAHYDROPHENAN-THRENE-2-CARBOXYLIC ACID ESTERS

Karl Miescher, Riehen, and Georg Anner, Basel, Switzerland, assignors to Ciba Pharmaceutical Products, Inc., Summit, N. J.

No Drawing. Application July 1, 1948, Serial No. 36,444. In Switzerland July 10, 1947

6 Claims. (Cl. 260—473)

The present invention relates to the isomerization of 1-keto-2-alkyl-octahydrophenanthrene-2-carboxylic acid esters.

Owing to the presence of three asymmetrical carbon atoms these 1-keto-octahydrophenanthrene carboxylic acid esters exist in the form of four racemates. Thus, for example, the two 1 - keto - 2 - methyl-7-methoxy-1,2,3,4,9,10,11,12-octahydrophenanthrene-2-carboxylic acid methyl esters melting at 87–89° C. and 133–135° C. are obtained.

According to the present invention compounds having the same steric configuration as the 1-keto - 2 - methyl - 7 - methoxy - 1,2,3,4,9,10,11,12-octahydrophenanthrene-2-carboxylic acid methyl ester melting at 133–135° C., are made by treating with an alkaline agent a 1-keto-2-alkyl-1,2,3,4,9,10,11,12 - octahydrophenanthrene-2-carboxylic acid ester which has the same steric configuration as the 1-keto-2-methyl-7-methoxy-1,2,3,4,9,10,11,12 - octahydrophenanthrene-2-carboxylic acid methyl ester melting at 87–89° C.

As starting materials there may be used, for example, the 1-keto-2-methyl-7-methoxy-1,2,3,-4,9,10,11,12-octahydrophenanthrene-2-carboxylic acid methyl ester melting at 87–89° C. or another 1-keto-2-alkyl-(such as -2-methyl or -2-ethyl)-1,2,3,4,9,10,11,12 - octahydrophenanthrene-2-carboxylic acid ester of corresponding steric configuration, for example, a methyl, ethyl, propyl or butyl ester, and especially one which contains in the 7-position an etherified hydroxyl group, such as an alkoxy or aralkoxy group, for example, a methoxy, ethoxy or benzyloxy group. The preparation of the aforesaid starting materials is described in Experientia, vol. 3, page 279 (1947) and in Helvetica Chimica Acta, vol. 30, page 1422 (1947).

For the isomerization treatment in accordance with the invention there is used an alkaline agent, for example, an alkali metal hydroxide or an alkaline earth metal hydroxide, such as sodium hydroxide, potassium hydroxide, lithium hydroxide or calcium hydroxide, alkali metal carbonates or alkaline earth carbonates such as sodium carbonate or potassium carbonate, or sodium bicarbonate or potassium bicarbonate, ammonia, strong organic bases such as trimethylbenzylammonium hydroxide, or an adsorptive agent of alkaline reaction such, for example, as alkaline aluminum hydroxide. The reaction may advantageously be conducted in an organic solvent medium and in the presence or absence of water.

By the process of the invention a substantial enrichment of compounds having the steric configuration of the 1-keto-2-methyl-7-methoxy-1,2,3,4,9,10,11,12 - octahydrophenanthrene-2-carboxylic acid methyl ester melting at 133–135° C. may be brought about. If desired, constituents which have not undergone isomerization may be isolated by known methods, e. g. by fractional crystallization, and again subjected to the treatment of the invention.

The products of the invention find application as intermediate products for the production of medicaments.

The following examples illustrate the invention, the parts being by weight unless otherwise stated and the relationship of parts by weight to parts by volume being the same as that of the gram to the cubic centimeter:

Example 1

1 part of 1-keto-2-methyl-7-methoxy-1,2,3,4,-9,10,11,12 - octahydrophenanthrene -2-carboxylic acid methyl ester melting at 87–89° C. is dissolved in a mixture of benzene and petroleum ether, and is adsorbed by the elutriation process on 50 parts of aluminum oxide having an alkaline reaction. The thus-prepared chromatographic column is then washed with a mixture of benzene and petroleum ether until no more starting material is eluted. Ether is then allowed to run through the column, and the isomerized keto-ester is obtained by evaporating the ethereal solution. The resulting 1-keto-2-methyl-7-methoxy -1,2,3,4,9,10,11,12-octahydrophenanthrene-2-carboxylic acid methyl ester is obtained, after a single recrystallization from acetone, in the form of long water-clear prisms melting at 133–135° C.

1 - keto-2-methyl-7-hydroxy-1,2,3,4,9,10,11,12-octahydrophenanthrene-2-carboxylic acid esters, which are etherified in the 7-position and correspond in steric configuration to the above mentioned keto-ester melting at 87–89° C., can be isomerized in an analogous manner, e. g. 1-keto-2 - methyl-7-ethoxy-1,2,3,4,9,10,11,12-octahydrophenanthrene-2-carboxylic acid ethyl ester or 1-keto - 2 - methyl - 7-propyloxy-1,2,3,4,9,10,11,12-octahydrophenanthrene-2-carboxylic acid methyl ester.

Example 2

1 part by volume of a 2N-aqueous solution of caustic soda is added to a solution of 2 parts of 1-keto-2-methyl-7-methoxy-1,2,3,4,9,10,11,12-octahydrophenanthrene-2-carboxylic acid methyl ester melting at 87–89° C. in 30 parts by volume of methanol. After a short time the isomeric 1-keto-2-methyl-7-methoxy-1,2,3,4,9,10,11,12-octahydrophenanthrene-2-carboxylic acid methyl ester melting at 133–135° C. begins to crystallize in the form of long crystals. There can be recovered from the mother liquor, after treatment with caustic soda solution as described above, further quantities of the keto-ester melting at 133–135° C.

The isomerization can also be carried out with the 1-keto-2-alkyl-7-methoxy-1,2,3,4,9,10,11,12-octahydrophenanthrene-2-carboxylic acid esters which have the steric configuration of the keto-ester melting at 87–89° C., e. g. 1-keto-2-ethyl-7-methoxy-1,2,3,4,9,10,11,12-octahydrophenanthrene-2-carboxylic acid methyl ester.

*Example 3*

To a solution of 1 part of 1-keto-2-methyl-7-methoxy-1,2,3,4,9,10,11,12-octahydrophenanthrene-2-carboxylic acid methyl ester, melting at 87–89° C., in 15 parts by volume of methanol is added 1 part by volume of a 10% aqueous sodium carbonate solution, whereupon a part of the sodium carbonate separates out in fine crystalline form. After some time, the 1-keto-2-methyl-7-methoxy-1,2,3,4,9,10,11,12-octahydrophenanthrene-2-carboxylic acid methyl ester, which melts at 133–135° C., crystallizes out of the mixture in the form of water-clear prisms.

*Example 4*

1 part of 1-keto-2-methyl-7-methoxy-1,2,3,4,9,10,11,12-octahydrophenanthrene-2-carboxylic acid methyl ester, melting at 87–89° C., is dissolved in 10 parts by volume of methanol, 1 part by volume of a 30% trimethylbenzylammonium hydroxide solution is added, and crystallization is allowed to take place, whereupon the 1-keto-2-methyl-7-methoxy-1,2,3,4,9,10,11,12-octahydrophenanthrene-2-carboxylic acid methyl ester which melts at 133–135° C. is obtained.

The same result may be obtained by using 1 part by volume of a 30% aqueous ammonia solution as the alkaline agent in this example.

Having thus described, what is claimed is:

1. A process for the isomerization of a keto-octahydrophenanthrene carboxylic acid ester, which comprises treating a compound of the formula

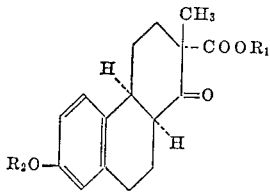

in which each of $R_1$ and $R_2$ stands for a lower alkyl radical, which compound has the same steric configuration as 1-keto-2-methyl-7-methoxy-1,2,3,4,9,10,11,12-octahydrophenanthrene-2-carboxylic acid methyl ester melting at 87–89° C., with an alkaline agent selected from the group consisting of an alkali metal hydroxide, an alkaline earth metal hydroxide, an alkali metal carbonate, an alkaline earth metal carbonate, ammonia and trimethylbenzyl-ammonium hydroxide, as isomerizing agent at room temperature in a solvent for the keto ester to be isomerized, whereby isomerization takes place.

2. A process for the isomerization of a keto-octahydrophenanthrene carboxylic acid ester, which comprises treating 1-keto-2-methyl-7-methoxy-1,2,3,4,9,10,11,12-octahydrophenanthrene-2-carboxylic acid methyl ester melting at 87–89° C. and corresponding to the formula

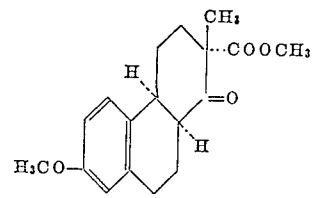

with an alkaline agent selected from the group consisting of an alkali metal hydroxide, an alkaline earth metal hydroxide, an alkali metal carbonate, an alkaline earth metal carbonate, ammonia and trimethylbenzyl-ammonium hydroxide, as isomerizing agent at room temperature in a solvent for the keto ester to be isomerized, whereby isomerization takes place.

3. A process for the isomerization of a keto-octahydrophenanthrene carboxylic acid ester, which comprises treating a compound of the formula

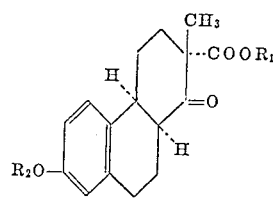

in which each of $R_1$ and $R_2$ stands for a lower alkyl radical, which compound has the same steric configuration as 1-keto-2-methyl-7-methoxy-1,2,3,4,9,10,11,12-octahydrophenanthrene-2-carboxylic acid methyl ester melting at 87–89° C., with an alkali metal hydroxide, as isomerizing agent, at room temperature in a solvent for the keto ester to be isomerized, whereby isomerization takes place.

4. A process for the isomerization of a keto-octahydrophenanthrene carboxylic acid ester, which comprises treating a compound of the formula

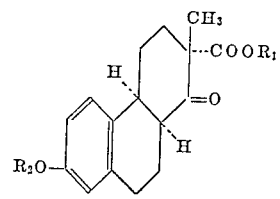

in which each of $R_1$ and $R_2$ stands for a lower alkyl radical, which compound has the same steric configuration as 1-keto-2-methyl-7-methoxy-1,2,3,4,9,10,11,12-octahydrophenanthrene-2-carboxylic acid methyl ester melting at 87–89° C., with an alkali metal salt of carbonic acid, as isomerizing agent, at room temperature in a solvent for the keto ester to be isomerized, whereby isomerization takes place.

5. A process for the isomerization of a keto-octahydrophenanthrene carboxylic acid ester, which comprises treating a compound of the formula

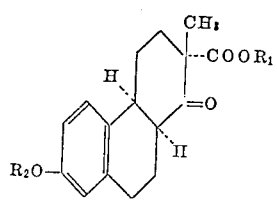

in which each of $R_1$ and $R_2$ stands for a lower alkyl radical, which compound has the same steric configuration as 1-keto-2-methyl-7-methoxy-1,2,3,4,9,10,11,12 - octahydrophenanthrene - 2 - carboxylic acid methyl ester melting at 87–89° C., with ammonia, as isomerizing agent, at room temperature in a solvent for the keto ester to be isomerized, whereby isomerization takes place.

6. A process for the isomerization of a keto-octahydrophenanthrene carboxylic acid ester, which comprises treating a compound of the formula

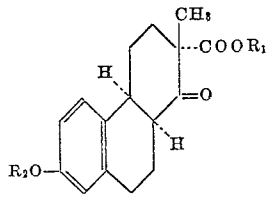

in which each of $R_1$ and $R_2$ stands for a lower alkyl radical, which compound has the same steric configuration as 1-keto-2-methyl-7-methoxy-1,2,3,4,9,10,11,12 - octahydrophenanthrene - 2 - carboxylic acid methyl ester melting at 87–89° C., with trimethylbenzylammonium hydroxide, as isomerizing agent, at room temperature in a solvent for the keto ester to be isomerized, whereby isomerization takes place.

KARL MIESCHER.
GEORG ANNER.

REFERENCES CITED

The following references are of record in the file of this patent:

Fischer, Berichte, vol 23, p. 799 (1890).
Bergmann, "Isomerism and Isomerization," Interscience Publishers Inc., New York, N. Y., 1948, pp. 84–86.